Nov. 12, 1963 W. W. WITORT 3,110,753
CONDUIT RACEWAY SYSTEM AND COMPONENTS THEREFOR
Filed Sept. 1, 1960 3 Sheets-Sheet 1
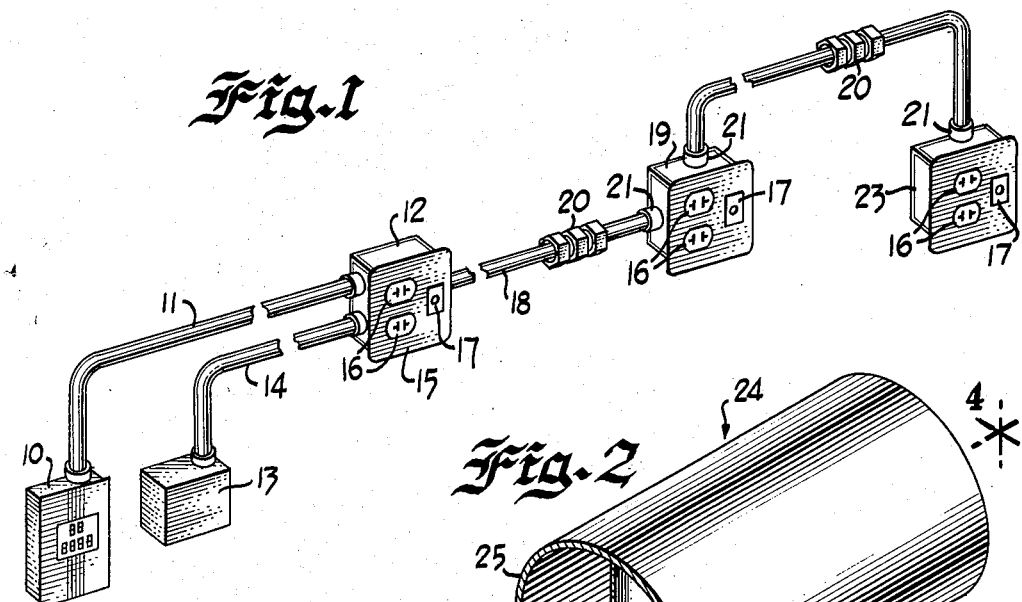
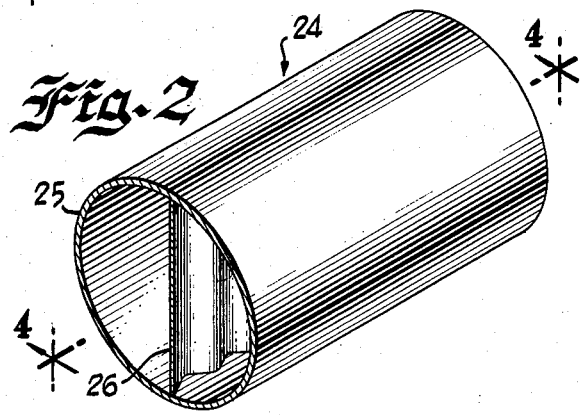
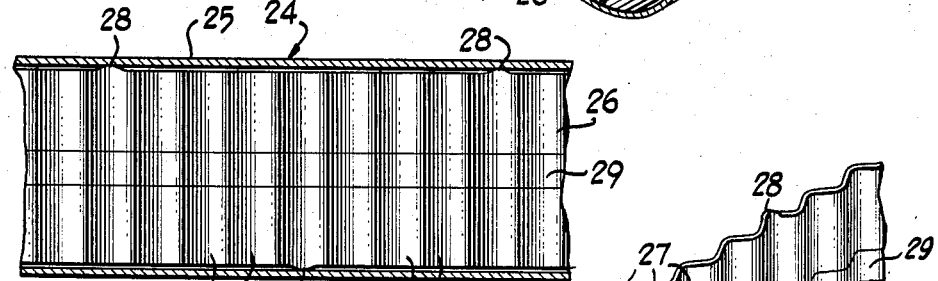
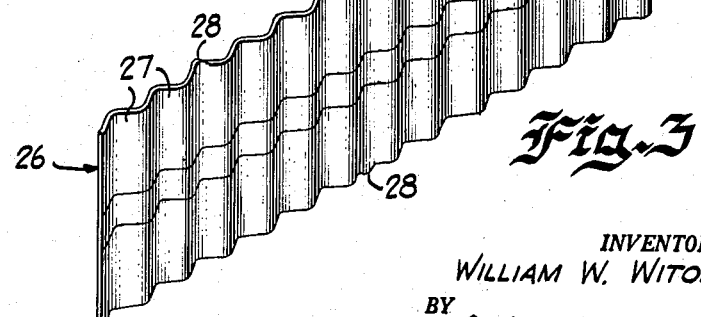
INVENTOR.
WILLIAM W. WITORT
BY John D. Dewey
ATTORNEY

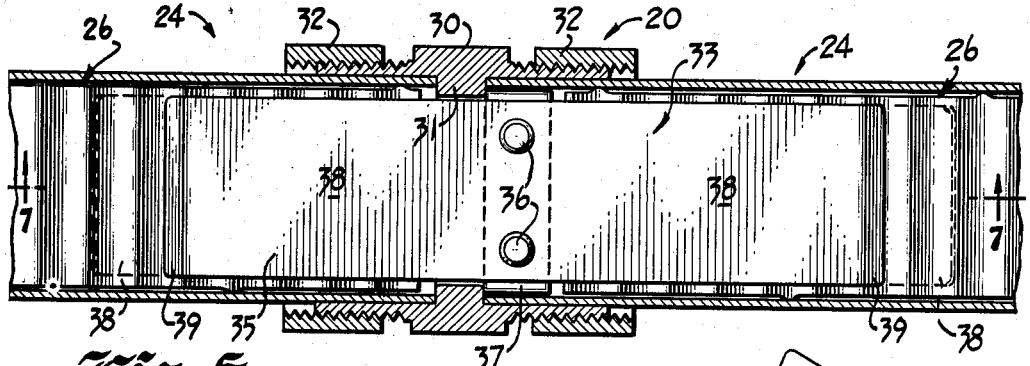
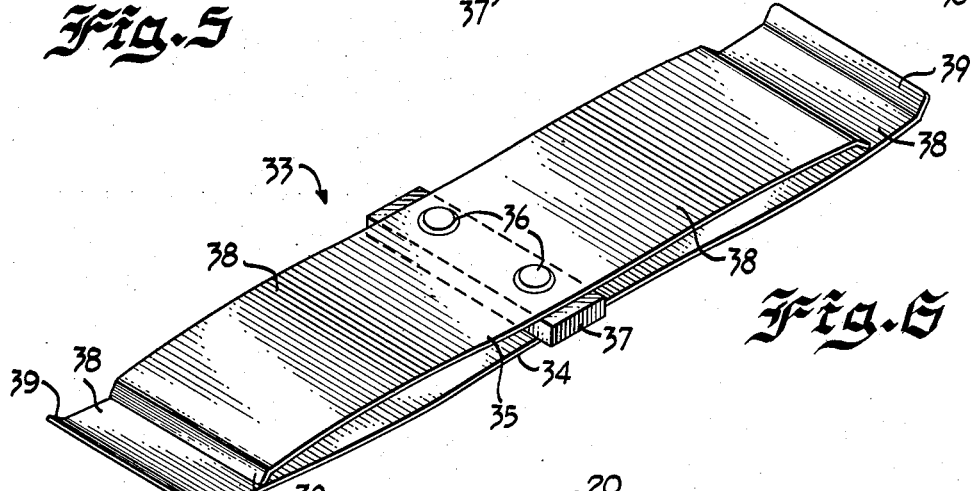
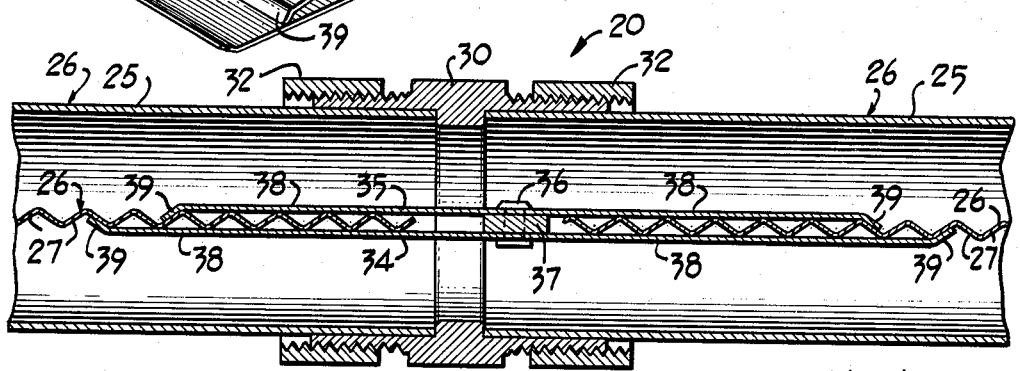
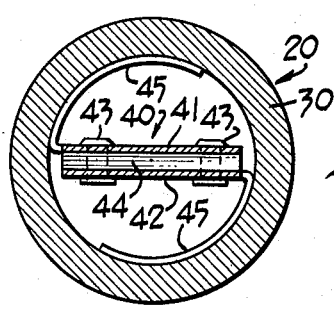
INVENTOR.
WILLIAM W. WITORT
BY
John D. Dewey
ATTORNEY.

Nov. 12, 1963   W. W. WITORT   3,110,753
CONDUIT RACEWAY SYSTEM AND COMPONENTS THEREFOR
Filed Sept. 1, 1960   3 Sheets-Sheet 3

INVENTOR.
WILLIAM W. WITORT
BY
John D. Dewey
ATTORNEY.

United States Patent Office 3,110,753
Patented Nov. 12, 1963

3,110,753
CONDUIT RACEWAY SYSTEM AND
COMPONENTS THEREFOR
William W. Witort, 1480 N. Milwaukee, Libertyville, Ill.
Filed Sept. 1, 1960, Ser. No. 53,448
10 Claims. (Cl. 174—65)

The present invention relates to internally divided raceway systems particularly adapted for fabrication from conduit and the like in the delivery of separate wiring systems such as power and communications to and from junction and outlet boxes in building structures.

As is commonly practiced, living unit building structures are wired through pipe-like conduit systems solely with regard to electrical wiring distribution. Additional wiring systems for use with telephone, intercom, television, etc., normally constitute separate installations requiring in many instances duplicated conduit systems or concealed and/or exposed wiring. In many instances the installation of duplicated wiring system is prohibitive from the standpoint of cost.

It is an object of the present invention to provide a new and improved raceway-type conduit system and components therefor which in a single system permits diverse wiring system distribution throughout a building structure.

A further object is to provide new and improved components for use in a sub-divided conduit system, the components being adapted for inexpensive manufacture and efficient and uncomplicated installation.

Still a further object is to provide a new and improved design for a raceway or conduit divider, the design providing for efficient bending of the raceway or conduit while maintaining internal sub-division thereof.

Another object is to provide a new and improved sub-divided conduit utilizing a special form of interior sub-dividing means which cooperatively functions with the conduit during installational bending and connection thereof.

Another object is to provide a special clip means for use in interconnecting the sub-dividing means of conduit sections.

A further object is to provide a new and improved raceway system including uniquely cooperating components which provide for interior subdivision to accommodate separate wiring systems.

An additional object is to provide a new and improved form of partition for use in sub-dividing a junction-type outlet box forming a part of the raceway system of the present invention.

Other objects not specifically set forth will become apparent from the following detailed description of the present invention made in conjunction with the accompanying drawings wherein:

FIG. 1 is a fragmentary perspective of the installed components of the raceway system of the present invention illustrating general utilization of the divided conduit principle in distributing the wires of diverse electrical systems;

FIG. 2 is a fragmentary perspective of one form of conduit constituting a part of the present invention and illustrating the positioning of a special strip-like sub-dividing wall therein which also forms a part of the invention;

FIG. 3 is a fragmentary perspective of a preferred form of strip insert for use as a sub-dividing wall in a conduit;

FIG. 4 is a fragmentary vertical section of the sub-divided conduit of FIG. 2 taken generally along line 4—4 therein;

FIG. 5 is a fragmentary vertical section of interconnected sub-divided conduit sections and illustrating a special clip means forming a part of the present invention;

FIG. 6 is a perspective of the clip means of FIG. 5;

FIG. 7 is a longitudinal section of the assembly of FIG. 5 taken along line 7—7 therein;

FIG. 8 is a transverse section of a conduit coupler and a modified form of clip means mounted therein;

Figure 9:
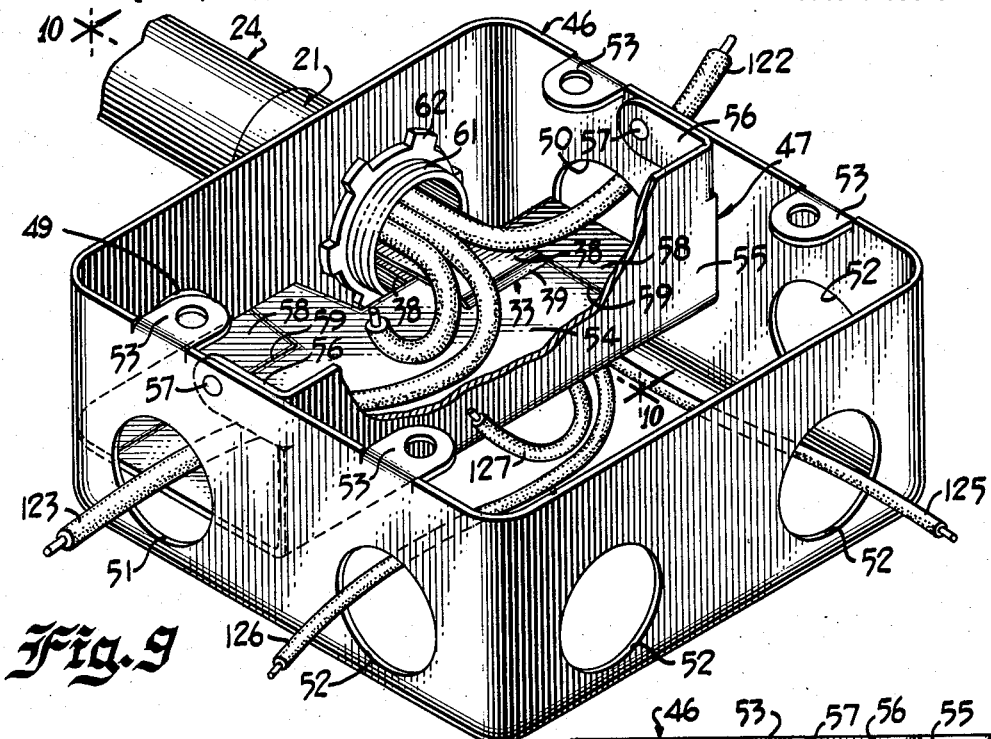
FIG. 9 is a fragmentary perspective of a portion of the raceway system of the invention, this view illustrating a junction-type outlet box having a sub-divided conduit connected thereto and cooperatively connected to a box partition also forming a part of the invention.

Generally, as shown in FIG. 1, a divided raceway-type conduit system may be used in distributing diverse wiring systems, such as power and telephone, throughout a plurality of junction or outlet boxes. An electrical power inlet box 10 will receive power lines delivered to a building structure and feed the same through a conduit 11 into a special outlet box 12 forming a part of the present invention. Similarly, a separate main telephone service box 13 will receive suitable telephone wiring delivered exteriorly to the building structure and feed the wiring through a conduit 14 to the box 12. This box maintains separation of the diverse wiring systems therein in a manner to be described with the power being connected to outlet receptacles 16 which are accessible through a cover plate 15 attached to the box 12. The telephone wiring is connected to a telephone jack 17 mounted in the box 12 and also accessible through the face plate 15 thereof.

A special sub-divided conduit 18 of a type to the described is connected at one end to the box 12 and at the other end to a similar box 19 and delivers both wiring systems therethrough to the box 19. The conduit 18 will generally be formed from a plurality of interconnected conduit sections depending upon the distance between the boxes 12 and 19. As illustrated, the conduit 18 includes a coupler 20 and a connection 21 which connects a section of the conduit 18 to the box 19. Special means of a type to be described are provided in the coupler 20 and connector 21 to maintain separation of the diverse wiring systems therethrough in conjunction with the sub-divided characteristics of the conduit. The box 19 is similarly provided with power outlet receptacles 16 and a phone jack 17 for service dispensing. A further conduit system portion 22 may be connected to the box 19 through a special connector arrangement 21 and extend through any number of special coupling arrangements 20 to a further outlet box 23, the conduit portion 22 being connected to the box 23 by the special connector arrangement 21. This further box 23 is also provided with power service receptacles 16 and a phone jack 17. Obviously, the system may be extended to any number of boxes indefinitely and may include junction boxes as distinguished from service outlet boxes to the extent desired.

The sub-divided conduit sections forming the raceways 18 and 20 are preferably constructed as illustrated in FIG. 2. In this figure a conduit section 24 is illustrated as including a cylindrical, thin wall conduit 25 having received internally thereof a transverse sub-dividing strip 26. This strip is formed from semi-rigid material and extends longitudinally of the conduit 24 to sub-divide the same into completely separated interior passages for the distribution of diverse wiring systems therethrough. As best shown in FIG. 3, the strip 26 is provided with a plurality of transversely extending wrinkle-type furrows or corrugations 27 which may preferably be equally spaced relative to one another longitudinally of the strip. The corrugations 27 may take various forms ranging from a well rounded arc to a virtual V-shape in cross section. With regard to the cross sectional shape of each corrugation, it is necessary and intended only that the strip be adequately wrinkled to provide for an excess of material to accommodate ready bending of the strip in any direction.

With the strip design described, the strip will readily conform to and accommodate any directional bending of the conduit 24 and maintain adequate sub-division therein for efficient wire feeding or pulling and requisite wire service separation. Thus if a conduit is bent in a direction coinciding with the transverse plane of the strip 26, the corrugations 27 provide adequate excess of material to permit complete bending of the strip in the direction specified without buckling thereof. Furthermore, a bending of the conduit in a direction coinciding with the longitudinal axis of the strip 26, will be readily accommodated by the strip.

Preferably, the strip 26 is designed for insertion in the conduit as a separate element. In utilizing this technique the strip 26 will be of a width which is slightly less than the inner diameter of the conduit. Thus the strip 26 will be somewhat loose in the conduit with the difference in dimensions being generally illustrated in FIG. 4. With this preferred arrangement the strip 26 will be able to rotate and twist in the conduit with relative ease. This provides for ready accommodation of the strip 26 to bending of the conduit as it is not unusual that during bending the conduit becomes somewhat flattened. The provision of freedom of rotation of the strip in the conduit permits rotational translation of the strip 26 in the presence of any buckling or flattening of the conduit during bending to a position which will result in the strip being rotated offset relative to the direction of bending. Thus the strip 26 will find its own position in the conduit throughout a bend area under certain bending conditions although due to the design of the strip it will readily accommodate bending in a direction transversely thereof as described above. Actually the strip may prevent conduit buckling or flattening during bending depending on the circumstances. The strip 26 must be formed from adequately flexible material to provide for the functions described and with the corrugations 27 provided in the strip, the same will readily convolute longitudinally thereof to accommodate any conduit bending problems without destroying in any respect conduit interior sub-dividing efficiency.

Where the strip 26 is loosely mounted in the conduit for the purposes outlined above, it is preferred that suitable means be provided to frictionally hold the strip in the conduit to prevent the same from falling out an end thereof during handling of the conduit. The frictional holding must be of a nature which is just adequate to prevent longitudinal displacement of the strip from the conduit and yet permit bending functioning of the strip along the lines described above. One manner of providing adequate frictional contact between the strip and the inner surface of the conduit is shown in FIGS. 3 and 4. Spaced corrugations 27 of the strip 26 are provided at an end thereof with projecting conduit engaging means 28 in the form of tabs. These projections are readily formed by smearing the material of the strip 26 outwardly with the result that very thin tabs are formed. These tabs will engage the inner surface of the conduit as shown in FIG. 4 and will not interfere with the insertion of the strip in the conduit as the total frictional area of engagement is maintained at a minimum and just to an extent sufficient to prevent displacement of the strip from the conduit. The nature of the tabs 28 is such that the frictional contact established thereby is readily overcome during bending of the conduit or twisting of the strip as will be subsequently described. Any number of tabs 28 may be used and it is not necessary that they be provided at opposite edges of the strip in the manner illustrated.

Due to the nature of the dividing strip 26 with regard to its reaction to conduit bending and its accommodation of rotational twisting within the conduit, it is preferred that some adequate conduit passage identifying indicia be provided to maintain identification of the separate passages in the conduit. A preferred indicia-like means is illustrated in FIGS. 3 and 4 as being in the form of painted stripes or color lines 29 applied to opposite surfaces of the strip 26. Naturally, the indicia on one side of the strip will be of one color and the indicia on the other side will be a distinguishing color. In this manner, any rotational translation of the strip 26 within the conduit or convoluted longitudinal twisting of the separate wiring services in the passages will not result in loss of identification of the individual passages. Upon installation of the system the installer will make sure that the particular passage open for a specified wiring system at one box will deliver the wiring system to another box in the proper location merely by checking the color lines at each box. If the installer finds that due to rotational displacement of the strip in the conduit between the boxes the color lines are translated at one box, he need merely engage the strip 26 at the one box and rotate the same to bring about re-alignment of the passages and color indicia in the box as desired. Any suitable tool may be used for this purpose and the clip means to be described are particularly adapted for use in this manner. By reason of the corrugations 27 as previously described, the strip 26 may be readily twisted within the conduit to any extent desired even to the extent of 180°. The strip 26 will readily accommodate such localized twisting without losing any efficiency in maintaining interior sub-division of the conduit. Furthermore, it has been found that wires may be readily pulled through such twists without any noticeable resistance.

FIG. 5 illustrates a coupler connection of conduit sections 24—24 of the type generally illustrated in FIG. 1 and using a standard coupler 20. Such a coupler generally comprises a sleeve-like member 30 provided with a centrally located, internally projecting rib 31 and having oppositely directed externally threaded ends receiving thereon locking or clamping nuts 32. Received within the coupler 20 is a special clip 33 forming a part of the present invention and designed to inter-connect adjacent ends of the strips 26 in each conduit section 24 and provide a bridging means to continue the conduit sub-dividing function of the strip through the coupler 20.

As best shown in FIG. 6, the clip 33 is formed from a pair of cooperating spring leaf members 34 and 35 which are centrally joined by rivets 36 which extend therethrough and through an intermediate, transversely extending spacer bar 37. Each of the spring members 34 define at opposite ends thereof spring finger portions 38 which are adequately bowed toward one another for resilient clamping action on opposite sides of a strip 26 received therebetween. The finger portions 38 are paired for this purpose and the spring member 34 is of greater overall length than the spring member 35 to aid in clamping attachment of the clip to a strip or partition in a manner to be described. The end of each finger portion 38 is defined by an inturned transverse edge 39 designed to be received in a corrugation 27 of a strip 26 as shown in FIG. 7. This view illustrates the manner in which the clip 33 interconnects adjacent ends of strips 26 in the coupler 20 of FIG. 5.

In bringing about the strip connection of FIG. 7, the longest finger portion 38 of each pair of spring fingers at each end of the clip 33 is first engaged with an end portion of a strip 26 and upon the application of adequate pressure the finger portions are separated to an extent that the shorter finger portions may then be slid along the opposite surface of the strip 26 for clamping engagement thereof. The entire clip 33 is then slid along the strip 26 to an adequate extent until the strip is properly clamped as shown in FIG. 7. The inturned edges 39 of the finger portions 38 will readily slide along the corrugations 27 of the strip 26 and yet will conform adequately to the shape of the corrugations to eliminate the presence of any obstructing edges which might interfere with wire pulling. The spacer bar 37 may preferably at its opposite ends project laterally outwardly from the side edges of the spring members 34 and 35 for abutment with the rib 31 of the coupler 20 as shown in FIG. 5. With this arrangement the spacer bar 37 provides a further means whereby the interconnected strips 26 of coupled conduit sections will not slide longitudinally through the coupled conduits. By reason of the projecting ends of the spacer bar 37 the clip 33 may be fixedly secured in the coupler 20 if desired. If this procedure is followed, the inner rib 31 of the coupler may be eliminated and the projecting opposite ends of the spacer bar 37 will provide shoulders for end abutment of the conduit sections 24.

A modified form of clip 40 is illustrated in FIG. 8. This clip is basically the same as the clip 33 by reason of being provided with spring members 41 and 42 which are shaped just as the spring members 34 and 35 and which are centrally connected by rivets 43 and include therebetween a spacer bar 44. In this embodiment the spring members 41 and 42 are each provided with a laterally projecting and arcuately bowed positioning arm 45 which engages the inner surface of the coupler member 30 in resilient gripping relation. The arms 45 may be of any suitable width which are provided with an inherent resiliency which urges the arms outwardly and into tight frictional engagement with the inner surface of the coupler. With this design the clip 40 is provided with means which retains the clip and the coupler against accidental displacement and which also functions as edge abutment means for adjacent ends of conduit sections 24. In other words, with the provisions of the spring arms 45 the inner coupler rib 31 may be eliminated.

The functioning of the basic clip design in interconnecting conduit divider strips has been described. It will also be understood that the clip may be used as a means to twist a divider strip in the conduit about its longitudinal axis to change the passage location for proper wire distribution through the coupler. As previously described, translation of the dividing strip 26 in the conduit may be caused by conduit bending. However, the corrugations of the strip 26 are such that the strip may be readily twisted even to an extent of 180° about its longitudinal axis for re-alignment of prescribed passages. The color indicia 29 is provided as an identification means for this purpose. If re-alignment of the passages is necessary at a coupler 20, the clip may be readily used to twist an adjacent end of a strip. As shown in FIG. 7, a strip 26 may be received between the finger portions 38 of a clip to a substantial extent and the gripping actions of these finger portions will be adequate to bring about a complete twisting of the strip by merely rotating the clip clamped thereto.

FIG. 9 illustrates the details of a divided conduit connection to a junction or outlet box 46 including therein a special partition 47 which constitutes a part of the present invention. A conduit section 24 provided with the corrugated divider strip 26 as described above is connected to the box 46 by means of a connector 21. The box 46 is provided with a plurality of conduit connection openings 48 (see FIG. 10), 49, 50, 51, all of which are divided openings, and a plurality of undivided openings 52. Face plate attachment ears 53 are formed along the top wall edges of the box in the conventional manner.

Figure 11:
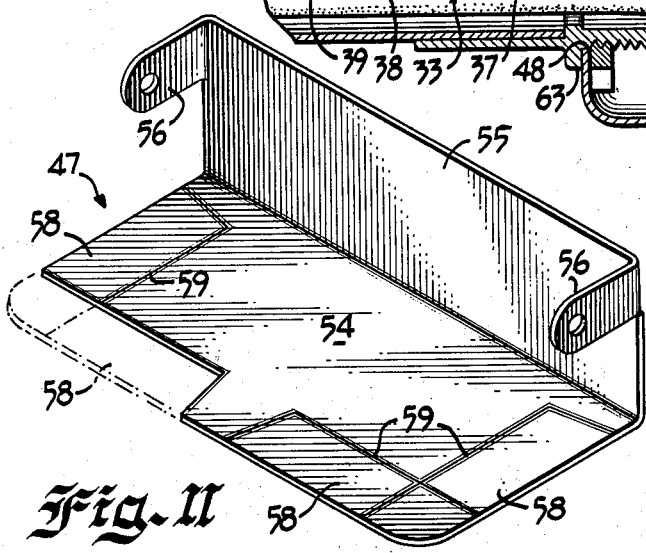
FIG. 11 is a perspective of the box partition of FIG. 9.

The partition 47 as best shown in FIG. 11 is generally L-shaped to provide a laterally projecting shelf-like portion 54 and a vertically upwardly projecting wall-like portion 55. The wall portion 55 is provided with radially directed ear-like attachment flanges 56 which are suitably apertured to receive therethrough fastening means 57 which in turn are attached to apertures formed in the box 46 shown in FIG. 9. Attachment of the partition 47 to the box 46 as shown in FIG. 9 results in the shelf portion 54 being suspended halfway between the bottom wall of the box and the open top thereof and the vertical wall 55 extending transversely of the upper half section of the box to sub-divide the same. The shelf portion 54 is provided with material cut-out areas 58 which may be defined by weakening score lines 59 for removal to provide room for connector attachment as shown in FIG. 9.

Figure 10:
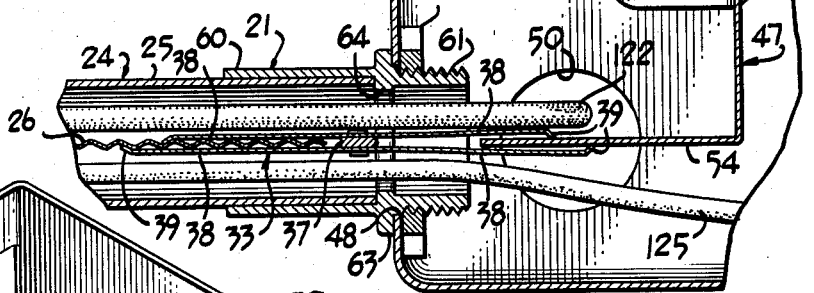
FIG. 10 is a fragmentary section of the conduit-box connection shown in FIG. 9 and taken generally along line 10—10 therein.

Referring to FIG. 10, the details of the use of a clip 33 in interconnecting a conduit strip 26 and a wall portion (the shelf portion) of the partition 47 are illustrated in detail. The connector 21 as previously described is of known type having a sleeve like portion 60 which is crimped onto the end of the conduit 24. The connector includes an externally threaded end portion 61 which is received through the opening 48 and the box 46 and receives thereabout a locking nut 62 which engages and clamps the wall portion of the box 46 between the same and a radially outwardly projecting shoulder 63 forming a part of the connector. The connector also internally thereof is provided with an inwardly projecting rib 64 which functions as an abutment means for the end of the conduit 24. The clip 33 extends through the connector 21 and the finger portions 38 of one end thereof clamp the end of a strip 26 in the manner previously described. The finger portions 38 of the other end of the clip 33 clamp the adjacent edge portion of the shelf 54 of the partition 47. In this manner the clip 33 serves to bridge the space between the end of the strip 26 in the conduit 24 and the edge of the shelf portion 54 of the partition 47. The clip 33 functions are not only in a coupler but also in a connector and in the latter it can also be used to twist the divider strip 26 to align the conduit passages with the proper sub-divided areas of the box 46.

Sub-division of the box 46 results in wire distribution in the manner illustrated in FIGS. 9 and 10. Wires delivered from the top passage in the conduit 24 as illustrated in the drawings are received in the top left hand portion of the box 46 as viewed. These wires may be connected to a phone jack or the like and may also be further distributed through the system through top passages in additional divided conduit sections (not shown) connected to the box openings 49, 50 and 51. Wires delivered through the bottom passage in the conduit 24 as best shown in FIG. 10 extend into the box 46 below the shelf portion 54 of the partition 47 and into the right hand portion of the box for connection to a suitable service outlet. These wires may be further distributed through the system either through the bottom passages of sub-divided conduit attached to the openings 49, 50 and 51 or through the remaining openings 52 into conventional conduit sections.

Obviously many modifications of the present invention may be made while still remaining within the scope thereof, which scope is defined by the appended claims.

I claim:

1. In a raceway system including the combination of a conduit section interconnected with a junction-type box by connector means, the provision of a longitudinally extending strip in said conduit section sub-dividing the same, a connector means attachment opening in an outer wall of said box providing communication between said conduit section and the interior of said box, partition means in said box having an edge portion extending across said opening to sub-divide the same to conform to the sub-division of said conduit section by said strip, and clip means interconnecting said strip and said edge portion, said clip means having pairs of cooperating spring fingers extending in opposite end directions with each pair receiving therebetween in clamped relation said strip or said edge portion.

2. In a raceway system including the combination of a conduit section interconnected with a junction-type box by connector means, the provision of a longitudinally extending strip in said conduit section sub-dividing the same, a connector means attachment opening in an outer wall of said box providing communication between said conduit section and the interior of said box, partition means in said box having an edge portion extending across said opening to sub-divide the same to conform to the sub-division of said conduit section by said strip, and clip means interconnecting said strip and said edge portion, said clip means having pairs of cooperating spring fingers extending in opposite end directions with said pairs receiving therebetween in clamped relation said strip and said edge portion, one finger of each pair being of greater length than the other to aid in clip application to said strip and said edge portion.

3. In a raceway system including the combination of a conduit section interconnected with a junction-type box by connector means, the provision of a longitudinally extending strip in said conduit section sub-dividing the same, a connector means attachment opening in an outer wall of said box providing communication between said conduit section and the interior of said box, partition means in said box having an edge portion extending across said opening to sub-divide the same to conform to the sub-division of said conduit section by said strip, and clip means interconnecting said strip and said edge portion, said strip being transversely corrugated, said clip means having pairs of cooperating spring fingers extending in opposite end directions with said pairs receiving therebetween in clamped relation said strip and said edge portion, at least the ends of the fingers of the pair clamping said strip being turned inwardly transversely thereacross to be received in a recessed area of a strip corrugation, one finger of each pair being of greater length than the other to aid in clip application to said strip and said edge portion.

4. The raceway system of claim 3 wherein said clip means is provided with laterally projecting means for fixing the same in said connector means.

5. The raceway system of claim 3 wherein said clip means is further provided with at least one laterally projecting and arcuately bowed positioning arm engaging the inner surface of said connector means to hold said clip means therein and provide edge abutment means for said conduit section.

6. In combination, a tubular conduit formed from uniformly bendable material to permit directional changes of said conduit while maintaining the internal circular shape thereof, and a dividing strip of generally flat longitudinally continuous shape in said conduit and extending longitudinally and transversely thereof to divide the interior of said conduit into separate passages, said strip being formed from readily bendable ductile metallic material having a rotational and longitudinal sliding fit within said conduit and provided with a longitudinally continuous series of transverse corrugations, said corrugations being of adequate depth to provide an excess of material which in combination with said sliding fit accommodates longitudinal extension of said strip during bending thereof with said conduit and rotational twisting thereof within said conduit relative thereto.

7. In combination, a tubular conduit formed from uniformly bendable material to permit directional changes of said conduit while maintaining the internal circular shape thereof, and a dividing strip of generally flat longitudinally continuous shape in said conduit and extending longitudinally and transversely thereof to divide the interior of said conduit into separate passages, said strip being formed from ductile metallic material having a sliding fit within said conduit and provided with a longitudinally continuous series of transverse corrugations, at least one edge of said strip being provided with longitudinally spaced integral projections in engagement with the inner surface of said conduit.

8. In a raceway system, the combination of tubular conduit sections with each section being formed from uniformly bendable material to permit directional changes of said sections while maintaining the internal circular shape thereof, a dividing strip in each of said sections of generally flat longitudinally continuous shape and extending longitudinally and transversely thereof to divide the interior of the conduit into separate passages, said strips being formed from ductile metallic material having a sliding fit within the conduit and provided with longitudinally continuous series of transverse corrugations, coupling means interconnecting said conduit sections, and strip bridging means interconnecting adjacent ends of the strips of said conduit sections, said coupling means having an internal tubular shape corresponding to that of said conduit sections, said bridging means being of generally flat plate-like configuration and being received in said coupling means and extending transversely thereof to sub-divide the interior thereof to conform with the subdivision of said conduit sections and constitute a bridging continuation of said strips.

9. The combination of claim 8 wherein said strip bridging means is in the form of double ended clips having pairs of cooperating spring fingers extending in opposite end directions with each pair receiving therebetween in clamped relation an end portion of a strip.

10. The combination of claim 8 wherein said strip bridging means is in the form of double ended clips having pairs of cooperating spring fingers extending in opposite end directions with each pair receiving therebetween in clamped relation an end portion of a strip, the end of each finger being turned inwardly transversely thereacross to be received in a recessed area of a strip corrugation.

References Cited in the file of this patent

UNITED STATES PATENTS

| | | |
|---|---|---|
| 1,642,142 | Cook | Sept. 13, 1927 |
| 1,920,811 | Schwabacher | Aug. 1, 1933 |
| 1,930,285 | Robinson | Oct. 10, 1933 |
| 1,979,804 | Lutz | Nov. 6, 1934 |
| 2,043,044 | Knoderer | June 2, 1936 |
| 2,073,490 | Lewin | Mar. 9, 1937 |
| 2,550,725 | Schultz | May 1, 1951 |
| 2,701,818 | Tims | Feb. 8, 1955 |
| 2,745,895 | Lideen | May 15, 1956 |
| 2,969,510 | White | Jan. 24, 1961 |

FOREIGN PATENTS

| | | |
|---|---|---|
| 254,308 | Great Britain | Oct. 21, 1926 |